United States Patent [19]

Montano

[11] Patent Number: 4,817,749

[45] Date of Patent: Apr. 4, 1989

[54] MOTOR SCOOTER HAVING IMPROVED STRUCTURE

[75] Inventor: Giacomo Montano, Livorno, Italy

[73] Assignee: Piaggio & C. S.p.A., Milan, Italy

[21] Appl. No.: 61,530

[22] Filed: Jun. 15, 1987

[30] Foreign Application Priority Data

Jun. 25, 1986 [IT] Italy .............................. 22380/86 [U]

[51] Int. Cl.⁴ .......................... B62K 11/10; B62J 9/00
[52] U.S. Cl. .................................. 180/119; 280/202;
224/32 R
[58] Field of Search ............... 280/289 A, 289R, 202,
280/281 B; 180/219; 224/32 A, 32 R, 275

[56] References Cited

U.S. PATENT DOCUMENTS

| 3,944,009 | 3/1976 | Katagiri | 180/219 |
|---|---|---|---|
| 4,372,602 | 2/1983 | Tsuchiya et al. | |
| 4,413,700 | 11/1983 | Shiratsuchi | 280/289 A |
| 4,488,618 | 12/1984 | Gaddi | 280/289 A |

FOREIGN PATENT DOCUMENTS

| 2397315 | 2/1979 | France . |
|---|---|---|
| 2467134 | 4/1981 | France . |
| 59-26089 | 2/1984 | Japan . |
| 59-192481 | 12/1984 | Japan . |
| 60-154964 | 8/1985 | Japan . |
| 61-81884 | 4/1986 | Japan . |
| 708586 | 6/1982 | United Kingdom . |
| 717154 | 9/1982 | United Kingdom . |
| 2115357 | 1/1983 | United Kingdom . |

OTHER PUBLICATIONS

Motociclismo, Dec. 12, 1960.
Young Machine, Dec. 12, 1980.
Uamaha box'n.
1985 Motorcyclist.

Primary Examiner—Charles A. Marmor
Assistant Examiner—Donn McGiehan
Attorney, Agent, or Firm—Diller, Ramik & Wight

[57] ABSTRACT

Motor scooter comprising a monocoque body in which at least a receptacle, suitable to house at least one crash helmet is provided.

11 Claims, 3 Drawing Sheets

MOTOR SCOOTER HAVING IMPROVED STRUCTURE

The object of the present invention is a motor scooter having an improved structure.

As a consequence of the growing use of the crash helmet by the users of motor scooters, the problem exists of preserving in a safe way the crash helmet on the vehicle when it is not used.

Such a problem has remained practically unsolved, because to date it has been not much felt: the possibility of placing the crash helmet on the vehicle in a sufficiently safeguarded way is, as it can be easily realized, a possibility particularly felt by the users, because of its undoubted relative usefulness under many circumstances.

In reality, some examples exist of fastening of crash helmets or of other things onto motor-scooters: these are generally fastening devices using particular removable accessories, which fasten the crash helmet onto the vehicle by exploiting determined external more or less congenial zones of the latter. By means of these devices, undoubtedly the problem of the transient preservation of the crash helmet is solved; but these are in any case solutions not offering a high guarantee against the danger of the illegal removal by unauthorized third parties: in all these possible solutions indeed the crash helmet remains well visible, even if it is fastened by security means.

It should be moreover considered that according to some of these solutions, the crash helmet must be fastened on the vehicle with its concavity being facing upwards, and this provided of course further problems in case of atmospheric precipitations.

Purpose of the present invention is to provide a reliable and industrially applicable solution to the problem of the housing of the crash helmet on board a motor-scooter.

Such a purpose is achieved by providing a motor-scooter comprising a monocoque body, characterized in that in said monocoque body at least a receptacle suitable to house at least one crash helmet is provided.

Hereunder a description is reported of an exemplifying form of practical embodiment of the invention, as illustrated in the attached drawings, wherein.

Figure 1:
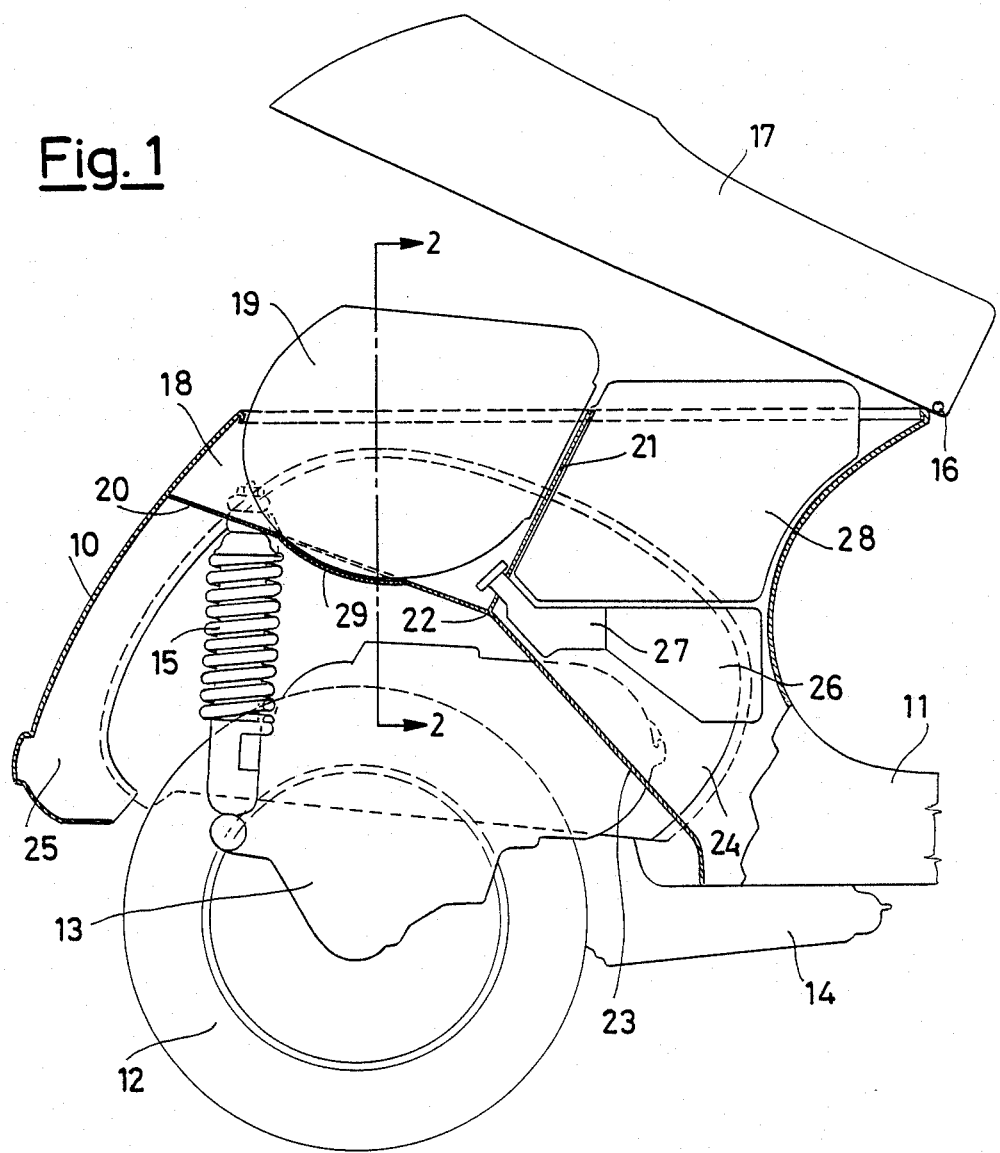
FIG. 1 shows a partially sectional side view of the rear portion of the motor scooter of the invention, with its saddle being partly lifted.

In the figures, the rear portion of a classic motor scooter can be recognized.

As known, such a motor scooter is provided with a monocoque body comprising a rear hollow structure, shown in the figures, and indicated with 10, extending into a footplate, partly shown in the figures and indicated with 11, and ending with a front shield, not shown.

To the rear hollow structure 10 two side hoods 10A and 10B are anchored.

As known, inside the said structure 10 the rear wheel 12, the power assembly 13 with the silencer 14, and the shock absorber 15 are partly housed.

Above the structure 10 a hinge saddle 17 is hinged in 16.

Inside the structure 10, under the saddle 17, a receptacle 18, suitable to partly house a crash helmet 19, is provided.

The receptacle 18 is bound by two partition walls 20 and 21 formed in the structure 10, converging into a transversal connection line 22, placed in a medium position relatively to the same structure. From the connection line 22, a third partition wall 23 branches off which, together with the wall 21, bounds a second inner receptacle 24, and together with the wall 20, bounds a third inner receptacle 25.

Inside the receptacle 24 the oil reservoir 26 and the air filter 27, and, immediately under the saddle 17, the fuel tank 28 are housed.

In this way, inside the motor scooter body a receptacle 18, suitably to partly house the crash helmet 19, has been created. The portion of crash helmet 19 protruding outside the receptacle 18 is housed by a hollow 30 provided in the the saddle 17, visible at FIG. 2.

To the purpose of housing the crash helmet 19 inside the motor scooter, the saddle 17 is lifted up, the crash helmet is inserted into the receptacle 18 (as shown at FIG. 1), and the saddle 17 is again lowered.

Figure 2:
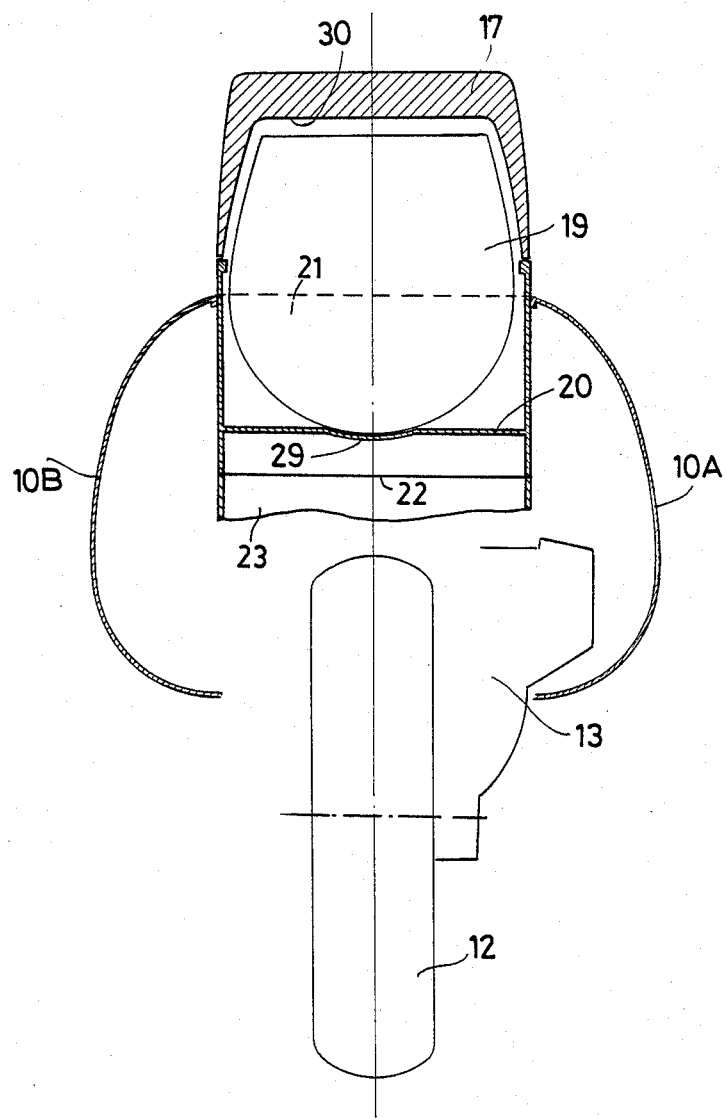
FIG. 2 is cross-sectional view of the motor scooter taken generally along line 2-2 of FIG. 1 with its saddle being lowered.
Figure 3:
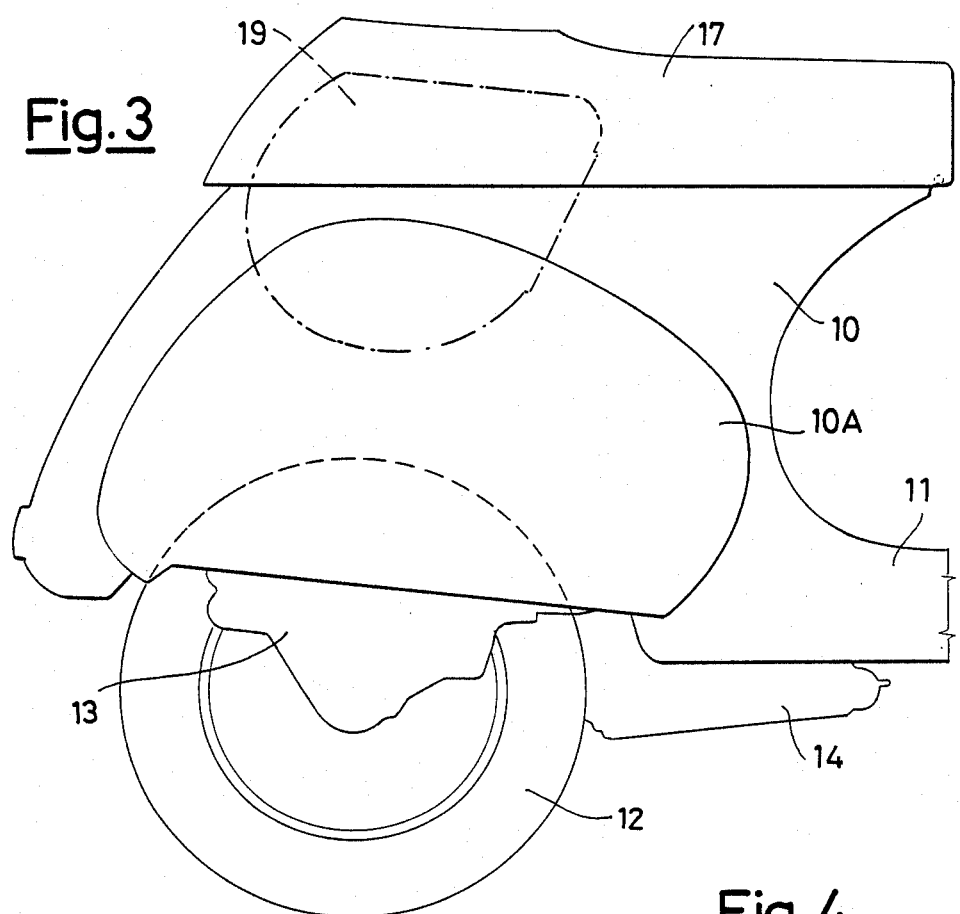
FIG. 3 shows, according to the same side view of FIG. 1, but in a more schematic way, the said rear portion of the motor scooter, with its saddle being lowered.
Figure 4:
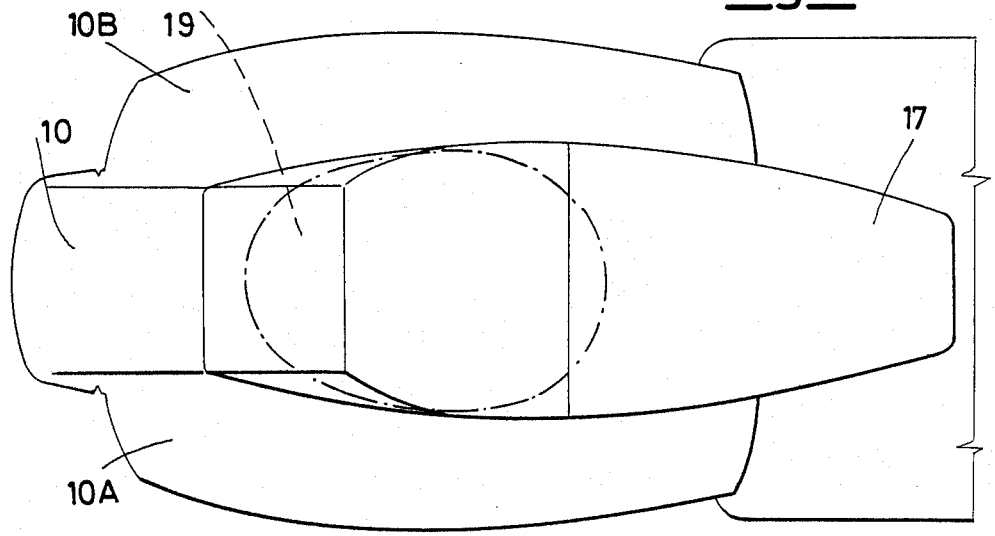
FIG. 4 is a top view of the said rear portion, as shown at FIG. 3.

At FIGS. 2, 3 and 4, the outline of the crash helmet housed inside the motor scooter is clearly shown.

In the wall 20 a cavity 29 is formed, which houses a corresponding concave portion of the crash helmet 19, as it is clearly visible at FIGS. 1 and 2, so that the crash helmet 19 can be housed in the structure 10 to a greater extent, without the whole wall 20 having to be positioned more downward.

The housing of the crash helmet 19 under the saddle 17 is a particularly happy solution, both because the crash helmet is protected against illegal removal, because the saddle can be normally locked in its lowered position by a lock, and because it is sheltered from the weather agents by the same saddle.

The distribution of the components, as illustrated in the example provided, takes into account the distribution of the weights, the possibility of access to the various receptacles, and the specific functions of the various components.

The arrangement of the partition walls 20. 21, 23 confers a particular strength of the structure 10 and consequently to all the motor scooter body.

However, other solutions could be adopted. For example, the receptacle 18 can be destined to house the fuel tank 28, and the receptacle 24 can be destined to house the crash helmet 19.

The arrangement and the shape of the crash-helmet-housing receptacle can be varied. The receptacle can also extend to zones comprised inside one or both of the side hoods of the motor scooter.

It is clear that in the receptacle destined to house the crash helmet, instead of this latter, also a thing having the same dimensions can be housed.

I claim:

1. A motor scooter comprising a self-supporting frameless monocoque body, said body including a rear body portion defined by a pair of opposite walls bridged by a rear wall, upper edges of said side and rear walls collectively defining an upper terminal edge of said rear body portion, said upper terminal edge defining an opening of a predetermined peripheral configuration and area, said opening being adapted to provide access to a volume accessible from above, a first transverse wall portion (21) partitioning said volume into a fuel tank volume and an adjacent crash helmet volume, means for securing said first transverse wall portion in transverse rigidity to said rear body portion thereby imparting rigidity to said monocoque body rear body portion, a fuel tank in said fuel tank volume, a second transverse wall portion (20) defining a bottom of said crash helmet volume, means for securing said second transverse wall portion in transverse rigidity to said rear body portion thereby imparting further rigidity to said monocoque body rear body portion, a crash helmet in said crash helmet volume and having a portion projecting through said opening beyond said upper terminal edge, a saddle closing said opening and overlying said crash helmet in a first closed position of said saddle, and means for mounting said saddle for movement to a second open position at which said crash helmet can be accessed from above.

2. The motor scooter as defined in claim 1 wherein said first and second wall portions merge with each other at a transverse line of connection disposed substantially below said upper terminal edge.

3. The motor scooter as defined in claim 1 wherein said second transverse wall portion has an upwardly opening recess within which is conformingly received a portion of said crash helmet.

4. The motor scooter as defined in claim 1 wherein said second transverse wall portion has an upwardly opening concavely curved recess within which is conformingly received a convexly curved portion of said crash helmet.

5. The motor scooter as defined in claim 1 including a third transverse wall portion (23), said third transverse wall portion being connected to said first and second transverse wall portions, and said third transverse wall portion extending forwardly and downwardly from its point of connection with said first and second transverse wall portions.

6. The motor scooter as defined in claim 1 wherein said first transverse wall portion (21) is secured by the securing means associated therewith to, between and generally normal to said pair of side walls.

7. The motor scooter as defined in claim 1 wherein said second transverse wall portion (20) is secured by the securing means associated therewith to, between and generally normal to said pair of side walls.

8. The motor scooter as defined in claim 1 wherein said first transverse wall portion (21) is secured by the securing means associated therewith to, beween and generally normal to said pair of side walls, and said second transverse wall portion (20) is secured by the securing means associated therewith to, between and generally normal to said pair of side walls.

9. The motor scooter as defined in claim 5 wherein said third transverse wall portion (23) is secured by securing means associated therewith to, between and generally normal to said pair of side walls.

10. The motor scooter as defined in claim 3 wherein said third transverse wall portion (23) is secured by securing means associated therewith to, between and generally normal to said pair of side walls.

11. The motor scooter as defined in claim 5 wherein a portion of said transverse wall portion (23) in part defines said fuel tank volume.

* * * * *